United States Patent
Schirrmacher

(10) Patent No.: US 6,361,260 B1
(45) Date of Patent: Mar. 26, 2002

(54) QUICK LOCKING FASTENER

(76) Inventor: Wendell E. Schirrmacher, 10012 Comanchee Ave., Chatsworth, CA (US) 91311

( * ) Notice: Subject to any disclaimer, the term of this patent is extended or adjusted under 35 U.S.C. 154(b) by 0 days.

(21) Appl. No.: 09/705,527

(22) Filed: Nov. 3, 2000

(51) Int. Cl.[7] ............................................... F16B 37/08
(52) U.S. Cl. ........................ 411/433; 411/267; 411/270
(58) Field of Search ............................... 411/265, 267, 411/270, 433

(56) References Cited

U.S. PATENT DOCUMENTS

| | | |
|---|---|---|
| 4,378,187 A | 3/1983 | Fullerton |
| 5,100,275 A | 3/1992 | Schirrmacher |
| 5,324,150 A | 6/1994 | Fullerton |
| 5,378,100 A | 1/1995 | Fullerton |
| 5,427,488 A * | 6/1995 | Fullerton et al. ........... 411/433 |
| 5,613,816 A * | 3/1997 | Cabahug ..................... 411/433 |
| 5,800,108 A * | 9/1998 | Cabahug ..................... 411/433 |

* cited by examiner

Primary Examiner—Neill Wilson

(74) Attorney, Agent, or Firm—Lynn & Lynn

(57) ABSTRACT

A threaded fastener for use with bolt comprises a housing having a central bore that includes a bolt insertion aperture and a plurality of cylindrical and frustoconical steps. A plurality of insert segments are placed within the central bore. Each insert segment includes an inwardly facing threaded portion and a front projection extending outwardly from the threaded portion. The front projection has a beveled edge arranged for sliding contact with a corresponding beveled portion of the housing. The front projection also has outwardly extending portion that cooperates with a ledge in the housing bore to limit longitudinal movement of the insert segment in the housing. A rear projection extends inwardly from the threaded portion and is arranged for sliding contact with a second beveled surface of the housing. An end cap retains the insert segments in the housing. The end cap includes a thin annular plate having an outer edge that fits within housing and a cylindrical portion that projects into the housing from an inner edge of the annular plate. The plurality of insert segments are displaced in the housing to accommodate longitudinal movement of bolt through the housing so that rotation of the housing relative to the bolt secures the threaded portions of the plurality of insert segments to the bolt with beveled surfaces of the housing engaging the front and rear projections of the insert segments to retain the insert segments within the housing as the housing is tightened on the elongate threaded member.

4 Claims, 5 Drawing Sheets

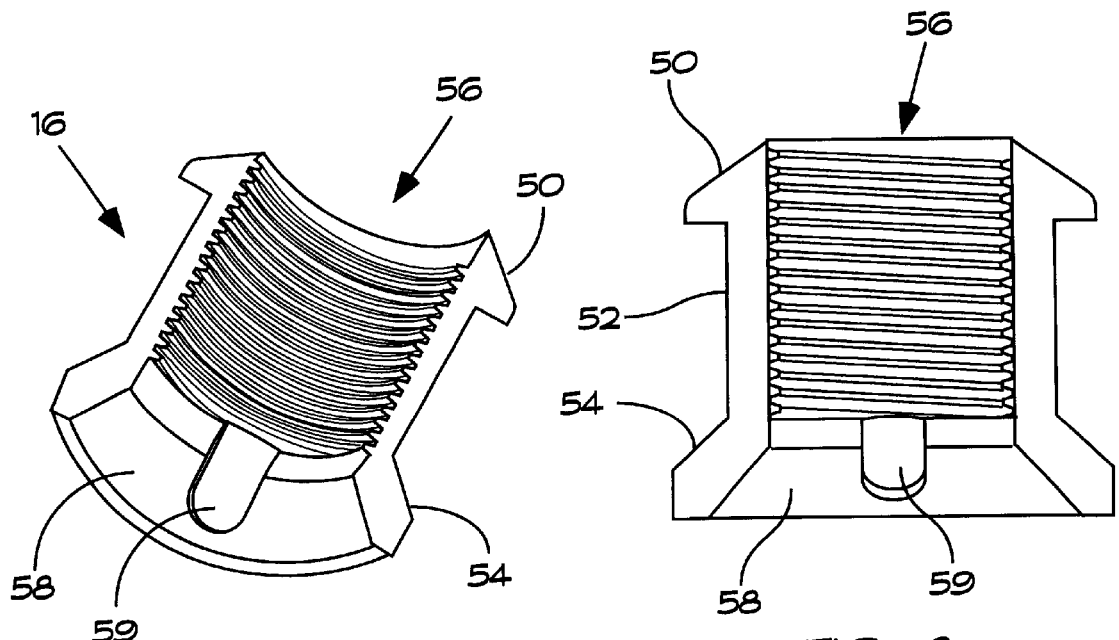
FIG. 7
FIG. 8
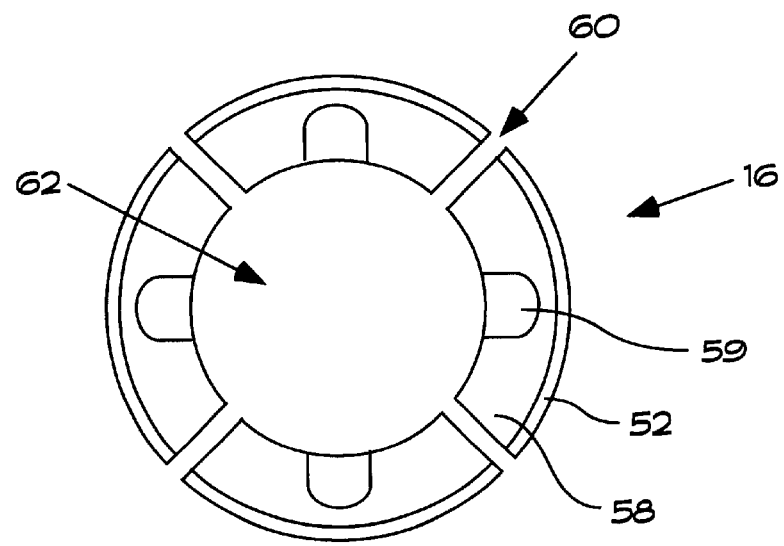
FIG. 9

QUICK LOCKING FASTENER

BACKGROUND OF THE INVENTION

This invention pertains to quick locking fasteners. More particularly, this invention pertains to quick engaging fastening nuts for engaging threaded portions of bolts, clamps, pipe fittings and the like.

Quick locking fastening nuts have been available for various purposes in the past. The objective of a quick locking fastening nut is to be able to transitionally slide the fastening nut on a bolt or threaded member without the necessity of rotation until the fastening nut is in substantial final engagement against &n abutment surface of the head of the bolt. A wrench or other tool is used to tighten the fastening nut during its final rotational engagement. This is achieved by a wedging action which causes a tightening of a segmented internally threaded insert set in the nut casing. The segments are spread apart by the threads of a bolt inserted through the threaded aperture defined by the segments, allowing the bolt to be pushed through by translational movement. However, the segments are sufficiently confined within the nut casing to allow the nut segments to grasp the threads when rotated into engagement.

In the prior art, one type of self locking nut uses a segmented insert set in a casing cavity. The insert set has a frustoconical exterior surface. The tendency of a bolt or threaded member acting against the threads of the insert of this device is to cause an uneven spread of the insert segments and applying uneven and excessive on the threads. As a result, self locking nuts such as these have been unable to fasten adequately.

U. S. Pat. No. 5,100,275, which issued Mar. 31, 1992 to the present inventor discloses a quick locking fastener that includes a fastening nut which has a casing having an internal cavity defining a central axis. The cavity has a segmented insert set comprising a plurality of mating insert segments disposed within the cavity of the casing. The insert set defines an annular substantially contiguous yet spreadable interior thread for mating with the threads of a threaded member such as a bolt. The exterior surface of the insert set has a first annular bevel surface adjacent a forward portion of the casing, and a second annular bevel surface of greater maximum radius than the first annular beveled surface which is positioned coaxial, parallel and spaced from the first annular bevel surface. The first and second bevels are at substantially the same angle to the central casing axis. First and second annular inclined surfaces on the interior surface of the casing abut the first and second bevel surfaces of the insert segments in sliding engagement. The first and second annular inclined surface allow the segments to be outwardly guided by spreading of the segments during translational movement by a threaded member, and inwardly pulled forward to centrally grasp the thread of a threaded member when rotated towards a fully engaged position. This provided generally balanced radial forces against the threads of a threaded member and the internal threads of the insert segments. Additional features of this device include a circular spring adjacent the rear of the insert segments, disposed about a bevel surface on an end cap. An annular retaining ring having plural inwardly directed tangs engages the insert segments to prevent rotation of the insert segments. A lock ring disposed intermediate the retaining ring and the interior of the end cap provides torque limiting, whereby the segments can rotate when the torque exceeds a predetermined design force.

U. S. Pat. No. 5,378,100, issued Jan. 3, 1995 to Fullerton discloses a rapidly engaging and disengaging threaded coupling fastener that includes a first member provided with external threads and a second member having an opening into which the first member is inserted. The second member is provided with a plurality of movably mounted internally threaded elements for receiving the external threads of the first member. The first member may be inserted into the second member by rectilinear sliding movement, after which the first member is rotated into tight engagement with the second member. Release of the first member is accomplished by rotating the first member very slightly in the opposite direction, after which simple manual manipulation of the second member withdraws the threaded elements from engagement, permitting the first member to be slidably removed from the second member.

SUMMARY OF THE INVENTION

The present invention provides a quick locking fastener assembly that has a simpler and stronger structure than previous devices. The quick locking fastener assembly according to the present invention includes a housing, two or more threaded inserts and an integral retainer ring and end cap. A spring may be included to bias the inserts toward the bolt insert opening and to provide torque limiting.

BRIEF DESCRIPTION OF THE DRAWINGS

The nature of the invention described herein may be best understood and appreciated by the following description taken in connection with the accompanying drawings in which:

FIG. 7 is a perspective view of an insert segment that may be included in the fastener of FIG. 1;

FIG. 8 is a front elevation view of the insert segment depicted in FIG. 7;

FIG. 9 is a top plan view showing four insert segments arranged to receive an end of a bolt;

DETAILED DESCRIPTION OF THE INVENTION

The present invention is an improvement to the invention disclosed and claimed in the inventor's U.S. Pat. No. 5,100,275, the disclosure of which is hereby incorporated by reference into the present disclosure.

Figure 1:
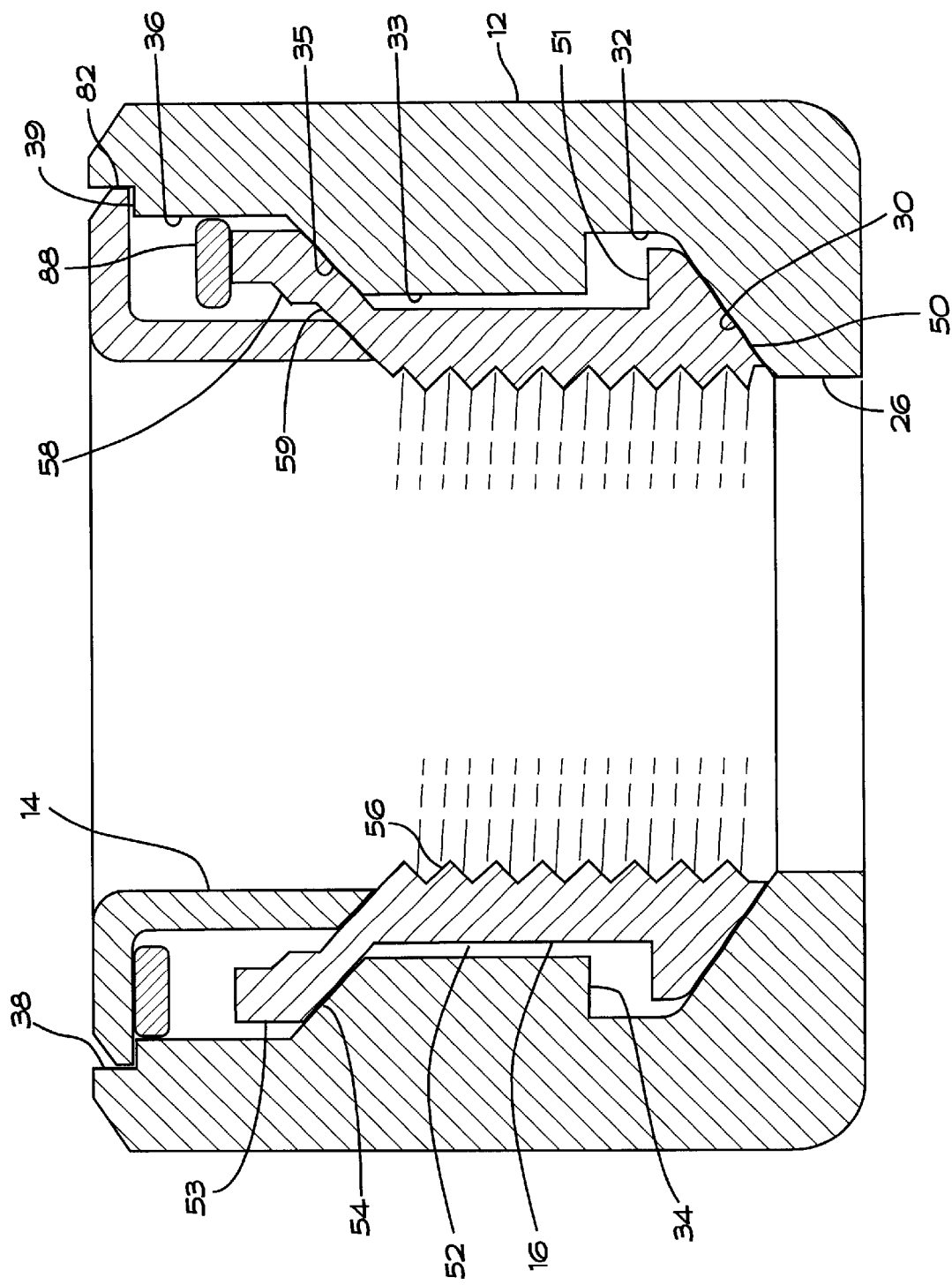
FIG. 1 is a cross-sectional view of a quick locking fastener in accordance with this invention.

Referring to FIG. 1, a quick locking nut assembly 10 according to the present invention includes a housing 12, and end cap 14 and a plurality of threaded insert segments 16. The quick locking nut assembly 10 is designed for receiving a bolt 18 by translational movement with secure fastening being achievable by only a small rotation of the nut assembly 10 after pure translational movement is no longer possible.

Figure 2:
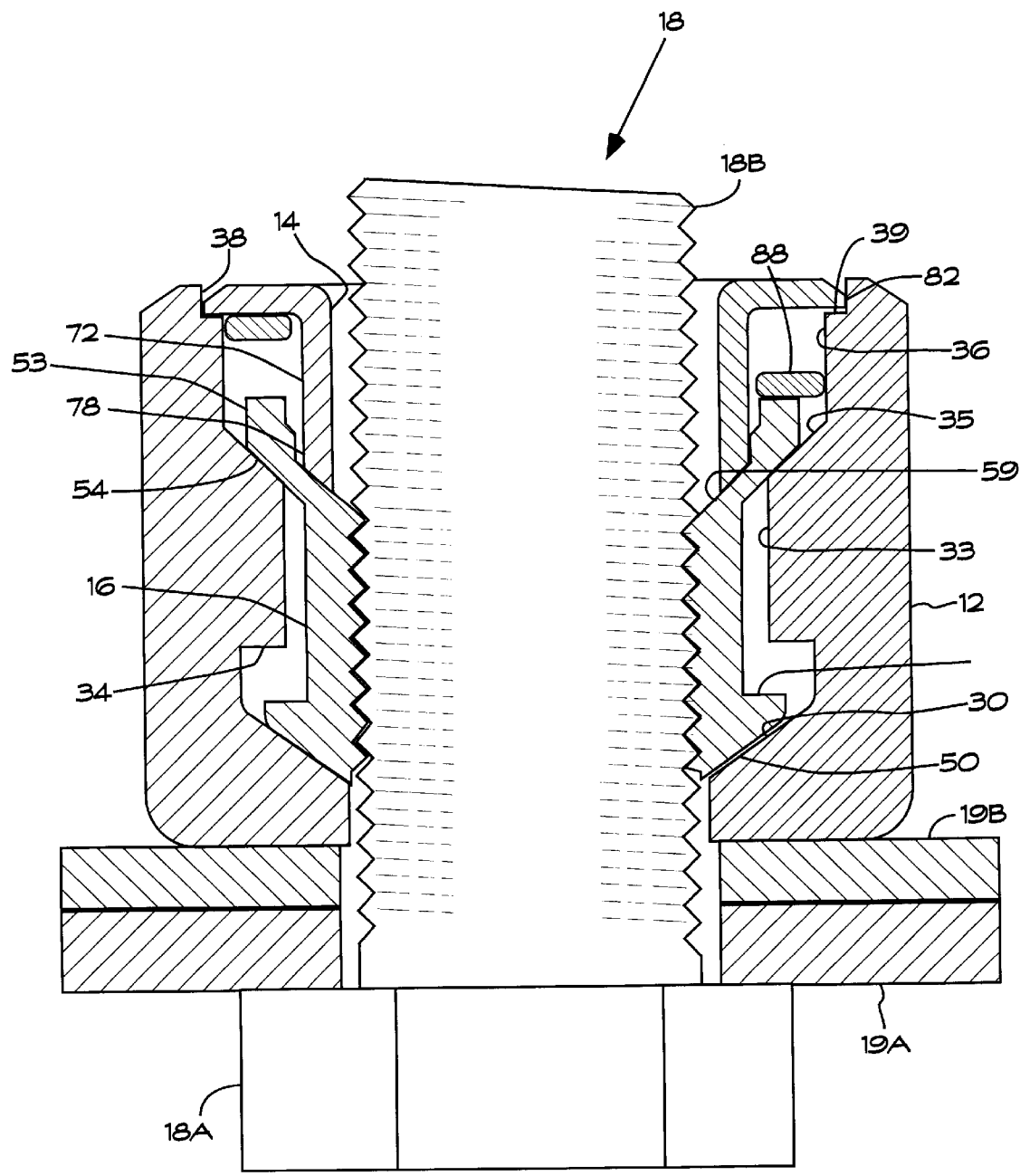
FIG. 2 is a cross-sectional view showing the fastener of FIG. 1 mounted on a bolt.
Figure 3:
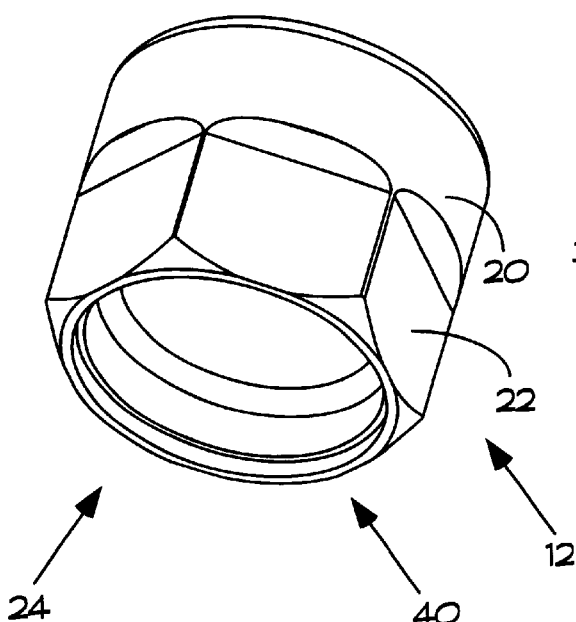
FIG. 3 is a perspective view of a housing that may be included in the fastener of FIG. 1.
Figure 4:
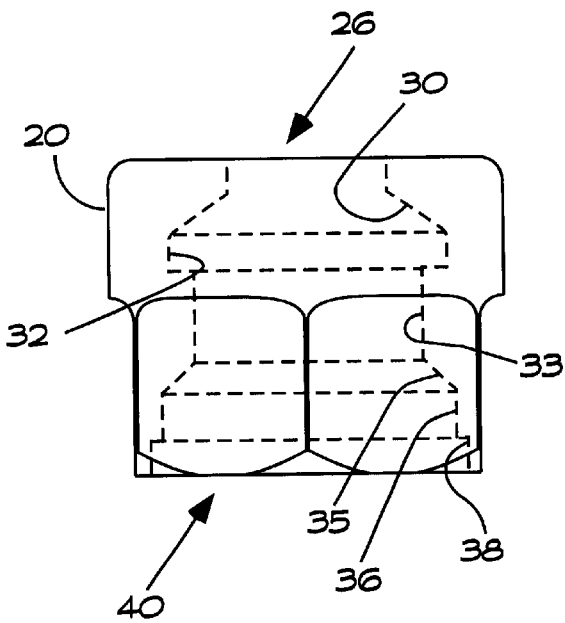
FIG. 4 is a side elevation view of the housing of FIG. 3.
Figure 5:
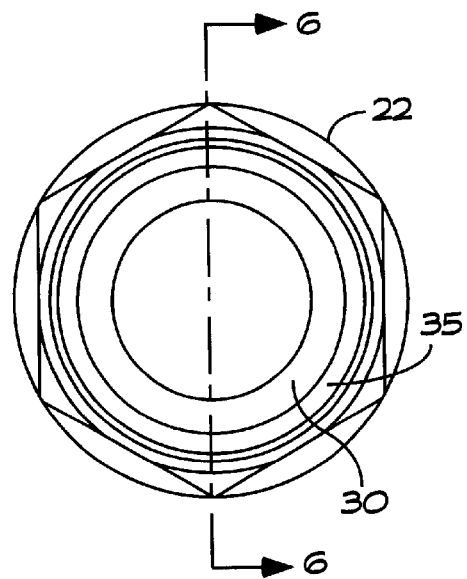
FIG. 5 is a top plan view of the housing of FIGS. 3 and 4.
Figure 6:
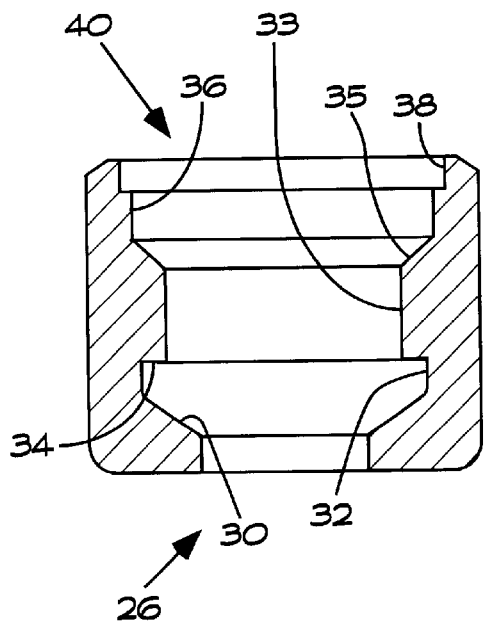
FIG. 6 is a cross sectional view taken along line 4—4 of FIG. 3.
Figure 10:
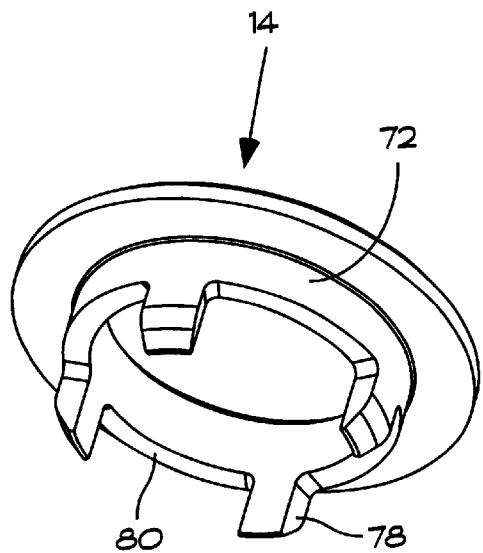
FIG. 10 is a perspective view of and end cap that may be in included in the fastener of FIG. 1.
Figure 11:
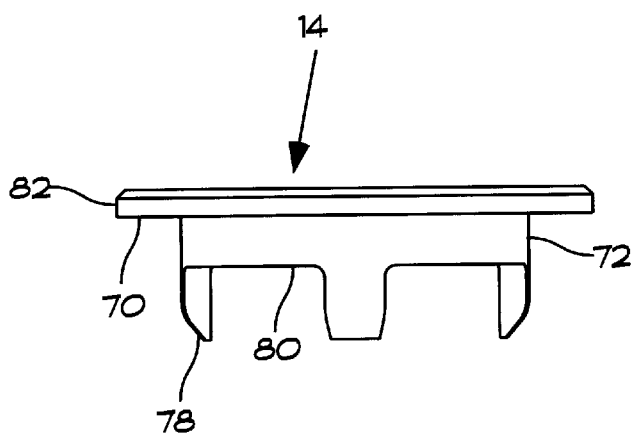
FIG. 11 is a front elevation view of the end cap of FIG. 10.
Figure 12:
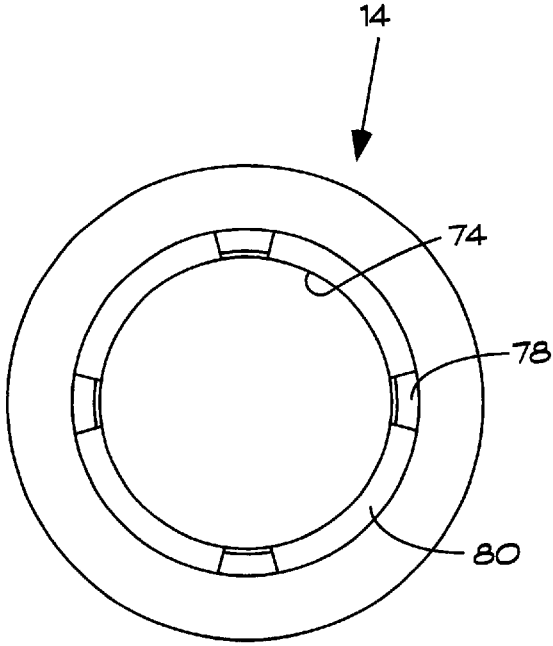
FIG. 12 is a top plan view of the end cap of FIGS. 10 and 11.
Figure 13:
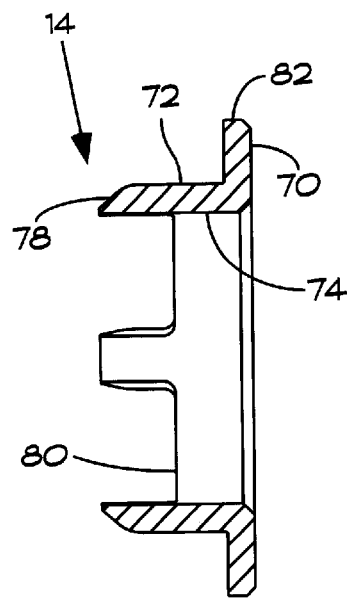
FIG. 13 is a cross sectional view taken along line 13—13 of FIG. 12.

FIG. 2 shows the nut assembly 10 according to the present invention being used with a bolt 18 to secure two plates 19A and 19B together. FIG. 2 shows only one simple example of how the nut assembly 12 may be used. Those skilled in the art will readily be aware of many other uses for the nut assembly 12.

The housing 12 is similar to the casing body disclosed in U.S. Pat. No. 5,100,275. The threaded insert segments 16 are essentially identical to the insert segments disclosed in U.S. Pat. No. 5,100,275.

Referring to FIGS. 3–6, the housing 12 has a front end 20 that is preferably formed to have a generally cylindrical exterior shape. A rear end portion 22 of the housing 12 preferably is formed to have a conventional hexagonal exterior shape. Having the front end 20 have a round outer surface with the outer end being hexagonal aids a person using the nut assembly 10 in identifying the proper end of the nut assembly for receiving the bolt. The nut assembly 10 functions properly only when the bolt is inserted into the front end 20 of the housing 12.

The housing 12 encloses a cavity 24 in which other components of the nut assembly 10 are mounted. The front end 20 includes a bolt insert aperture 26 that is formed to receive a bolt of the size for which the nut is designed without resistance. A first beveled cavity portion 30 of the cavity 24 is adjacent the bolt aperture 26. A first cylindrical cavity portion 32 is adjacent the first beveled cavity portion 30. The first cylindrical cavity portion 32 preferably has a larger diameter than the bolt insert aperture 26. A second cylindrical cavity portion 33 is adjacent the first cylindrical cavity portion. The second cylindrical cavity portion 33 has a diameter smaller than the first cylindrical cavity portion 32 to define a ledge 34 that functions as a stop to limit the longitudinal range of motion of the inserts 16 in the housing 12. A second beveled cavity portion 35 extends from the second cylindrical cavity portion 33. A third cylindrical cavity portion 36 extends from the wider end of the second beveled cavity portion 35. A fourth cylindrical cavity portion 38 having a diameter larger than that of the third cylindrical cavity portion 36 is formed at the rear end 40 of the housing 12. The step change in diameters between the cavity portions 36 and 38 defines a ledge 39 that faces outward to support the end cap 14.

The present invention may be practiced with two or more substantially identical insert segments placed in the cavity 24. Referring to FIGS. 7–9, the insert segment 16 has a front end 50 formed as a projection having a portion beveled at the same angle as the beveled cavity portion 30 in the housing 12. The projection 50 extends into the cavity portion 32 and has a ledge 51 that faces the ledge 34. An outer surface 52 of the insert segment 16 is configured to have the same radius of curvature as the cylindrical cavity portion 32. The insert segment 16 has a rear end portion 54 that is beveled at the same angle as the second beveled cavity portion 35. The outer surface 50 has a length such that the insert segment 16 may be placed in the cavity 24 with the front end 50 adjacent the first beveled cavity portion 30 and the rear end portion 54 adjacent the second beveled cavity portion 34 with the outer surface 50 being adjacent the wall of the cylindrical cavity portion 32.

The insert 16 has a threaded inner surface 56 that is formed to match the threads of a portion of the bolt 18. The rear end of the insert segment 16 also has an inner beveled surface 58. A generally U-shaped recess 59 is formed in the beveled surface 56 with the open end of the recess 60 terminating adjacent the inner portion of the threaded surface 56.

FIG. 9 shows an arrangement of four insert segments 16 when no bolt is present. The invention is not limited to the use of four insert segments. All that is required is that there be at least two insert segments mounted in the housing. In this configuration there is normally a gap 60 between adjacent insert segments 16. The gaps allow the bolt 18 to be inserted into the cavity 62 defined by the inner threaded surfaces of the inserts 16.

Referring to FIGS. 10–13, the end cap 14 has a thin annular end ring 70 formed to fit closely within the cylindrical cavity portion 38 at the rear end of the housing 12. A retainer ring 72 extends perpendicularly from the annular end ring 70. The annular end ring 70 and the retainer ring 72 preferably are concentric. The retainer ring 72 defines a cylindrical passage 74 where the outer end of the bolt 18 projects out of the nut assembly 10. A plurality of angularly spaced teeth or tines 78 extend out from and edge 80 of the retainer ring. The teeth preferably have beveled ends 82 that fit within the recesses 59 of the insert segments when the invention is fully assembled.

Assembly of the nut assembly according to the present invention includes the step of placing the insert segments in the housing 12 so that the beveled end 50 of the insert 16 is in the beveled cavity portion 30 of the housing 12. The teeth 78 of the end cap 14 are then placed in the recesses 59 of the inserts 16. The end cap may then secured in the housing 12 by machining the inner edge of the opening 38 so that it "rolls over" the outer edge. Other means for securing the end cap in the housing 12 may also be used.

Referring to FIGS. 1 and 2, the nut assembly according to the present invention may include a spring 88, which preferably is a wave spring. The spring 88 maintains the beveled edge 50 of the insert 16 in contact with the beveled surface 30 in the housing, which makes the nut assembly 10 feel essentially solid to a user. The spring 88 may also be used to make the nut assembly 10 be torque limited. The housing 12 will rotate relative to the inserts 16 when the torque limit is reached.

Still referring to FIGS. 1 and 2, it may be seen that when the nut assembly is tightly fastened to the bolt 18, the inserts 16 have moved radially inward and toward the front end 20 of the housing.

The nut assembly 10 according to the present invention is an improvement over the inventor's previous invention in that the end cap 14 include an integral retainer ring 70. The earlier device has a separate end cap and retainer ring. Another advantage of the present invention is that the area of contact between the beveled surfaces 30 and 35 of the housing and the beveled surfaces 50 and 51 of the insert segments is greater than in the prior art. This increased area of contact gives increased holding force that the prior art devices cannot achieve.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A rapidly engaging and disengaging threaded fastener for use with an elongate threaded member, comprising:

a housing having a central bore that includes:
- a bolt insertion aperture;
- a first beveled surface extending outward from the bolt insertion aperture to a first cylindrical surface;
- a second cylindrical surface adjacent the first cylindrical surface, the second cylindrical surface having a diameter less that of the first cylindrical surface such that there is a first ledge between the first and second cylindrical surfaces;
- a second beveled surface extending outward from the second cylindrical surface, a third cylindrical surface adjacent the outer edge of the second beveled surface; and
- a fourth cylindrical surface having a diameter greater than that of the third cylindrical surface and arranged to form a second ledge;

a plurality of insert segments formed to fit within the central bore, each insert segment including:
- an inwardly facing threaded portion;
- a front projection extending outwardly from the threaded portion, the front projection having a beveled edge arranged for sliding contact with the first beveled portion of the housing and having an outwardly extending portion that cooperates with the first ledge to limit longitudinal movement of the insert segment in the housing; and
- a rear projection having a beveled portion extending inwardly from the threaded portion and arranged for sliding contact with the second beveled surface of the housing; and an end cap for retaining the insert segments in the housing, the end cap being formed to include:
- a thin annular end ring having an outer edge that fits within the housing adjacent the fourth cylindrical surface;
- and a cylindrical portion that projects into the housing from an inner edge of the annular plate, the plurality of insert segments being displaced in the housing to accommodate longitudinal movement of an elongate threaded member through the housing, the threaded portions of the plurality of insert segments being in contact with the elongate threaded member such that rotation of the housing relative to the elongate threaded member secures the threaded portions of the plurality of insert segments to the elongate threaded member, the first and second beveled surfaces of the housing engaging the front and rear projections of the insert segments to retain the insert segments within the housing as the housing is tightened on the elongate threaded member; and wherein each of the plurality of insert segments includes a recess and the cylindrical portion of the end cap includes a plurality of angularly spaced apart, longitudinally extending teeth arranged to extend into the recesses to restrain the insert segments against rotational movement relative to the end cap.

2. The fastener of claim 1, further comprising a spring extending around the cylindrical portion of the end cap between the annular plate and inner end portions of the insert segments to provide an axial force to bias the insert segments toward the first and second beveled surfaces of the housing.

3. The fastener of claim 1, further comprising means for torque limiting means arranged to allow the housing to rotate relative to the plurality of insert segments when they are tightened to a predetermined torque.

4. The fastener of claim 3 wherein the torque limiting means comprises a wavy spring mounted in the housing to extend around the cylindrical portion of the end cap between the annular plate and inner end portions of the insert segments.

* * * * *